Patented Jan. 2, 1951

2,536,858

UNITED STATES PATENT OFFICE 2,536,858

INSECTICIDAL COMPOSITION COMPRISING 3 - CYANO - 1,4 - ENDOMETHYLENE - CYCLOHEXANE-5

Miller W. Swaney and Samuel B. Lippincott, Westfield, N. J., assignors to Standard Oil Development Company, a corporation of Delaware No Drawing. Application June 12, 1948, Serial No. 32,735

5 Claims. (Cl. 167—30)

This invention relates to new and useful improvements in insecticidal preparations. This invention also relates to methods of protecting organic material subject to attack by low orders of organisms.

It has now been found that 3-cyano-1,4-endomethylene-cyclohexene-5

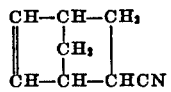

is an extremely effective compound for killing and repelling insects.

The preparation of 3-cyano-1,4-endomethylene-cyclohexene-5 is known and is given in the literature (J. Am. Chem. Soc. 64, 2460 (1942)). One of the methods of preparing is by the addition of acrylonitrile to cyclopentadiene. 3-cyano-1,4-endomethylene-cyclohexene-5 is a colorless oil that distills at 80–85° C. at 11 mm. pressure. It has an index of refraction, $n_D^{20}$, of 1.4876 and a density, $d_{25}^{25}$ of 1.0066.

The compound of this invention may be adsorbed on a solid carrier such as clay, talc and bentonite to be applied as a diluted dust. In addition, because of its volatility 3-cyano-1,4-endomethylene-cyclohexene-5 may be used as a fumigant insecticide as for example, in the eradication of insects in grain storage, and for application to the soil and for the control of nematodes and other plant pests. It may also be applied as a spray in a liquid carrier either as a solution in a solvent or as a suspension in a nonsolvent such as water. When applied as a spray in water, it may be desirable to incorporate a wetting agent.

Among the solvents for 3-cyano-1,4-endomethylene-cyclohexene-5 are naphtha, benzene, acetone, ethanol, kerosene, dioxane and other common organic solvents.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivates, esters of fatty acids such as ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereafter.

The compound of this invention may also be admixed with carriers that are themselves active such as parasiticides, hormones, herbicides, fertilizers and wetting agents, stomach and contact insecticides such as the arsenates, fluorides, rotenone and the various fish poisons and organic insecticides such as dichlorodiphenyl trichloroethane. Benzene-hexachloride and similar products may also be advantageously added.

This invention will be better understood by reference to the following examples of use of the compound of this invention for the stated purpose.

*Example 1.—German roach*

A number of German roaches were immersed for two minutes in a 0.25% aqueous suspension of 3 - cyano - 1,4 - endomethylene - cyclohexene - 5. After 96 hours 35% of the roaches had died. A control group of German roaches immersed in water showed 0% mortality in 96 hours.

*Example 2.—Milkweed bugs*

A number of milkweed bugs were treated as described in Example 1 for the roaches. A 35% kill was obtained. A control group of milkweed bugs showed 0% kill in 96 hours when immersed in plain water.

*Example 3.—American roach*

One group of adult American roaches were injected with 0.5 mg. of 3-cyano-1,4-endomethylene-cyclohexene-5 per gram of body weight and another group with one-half this amount. All the roaches were dead within 96 hours. A control group of adult American roaches injected with 0.5 mg./gram body weight of distilled water showed 5% kill in 96 hours.

It is to be understood that the invention is not limited to the specific examples which have been offered merely as illustration and that modification may be made within the scope of the appended claims without departing from the spirit of the invention.

What is claimed is:

1. An insecticidal composition comprising 3-cyano-1,4-endomethylene-cyclohexene-5 as the active ingredient admixed with a surface active dispersing agent which lowers the surface tension of water and thereby promotes aqueous colloidal emulsions of the 3-cyano-1,4-endomethylene-cyclohexene-5.

2. A composition as in claim 1 in which the dispersing agent is selected from the group consisting of long-chain alcohol sulfates, sulfonated amide derivatives, sulfonated ester derivatives, sulfonated aromatic derivatives, sulfonated alkylaryl derivatives, and petroleum sulfonates of $C_{10}$ to $C_{20}$ length.

3. An insecticidal aqueous emulsion comprising in combination 3-cyano-1,4-endomethylene-cyclohexene-5, water, and a minor proportion of an emulsifying agent.

4. An insecticidal dust composition comprising 3 - cyano - 1,4 - endomethylene - cyclohexene - 5 admixed with a powdered clay.

5. An insecticidal dust composition as in claim 4 in which the clay is bentonite.

MILLER W. SWANEY.
SAMUEL B. LIPPINCOTT.

REFERENCES CITED

The following references are of record in the file of this patent:

UNITED STATES PATENTS

| Number | Name | Date |
| --- | --- | --- |
| 2,200,564 | Schechter et al. | May 14, 1940 |
| 2,338,791 | Weedon | Jan. 11, 1944 |
| 2,365,936 | Bruson | Dec. 16, 1944 |
| 2,438,751 | Jones | Mar. 30, 1948 |

OTHER REFERENCES

McAllister et al.: J. Econ. Ent., vol. 23, pages 907–922 (see page 917), Dec. 1930.

Bruson: J. Am. Chem. Soc., vol. 64, page 2460 (1942).